United States Patent
Yamabe et al.

(10) Patent No.: US 10,827,766 B2
(45) Date of Patent: Nov. 10, 2020

(54) HIGH-MOISTURE-CONTENT GUMMI CANDY

(71) Applicant: UHA MIKAKUTO CO., LTD., Yamatokooriyama (JP)

(72) Inventors: Fumitaka Yamabe, Yamatokooriyama (JP); Koichi Masumoto, Yamatokooriyama (JP); Kiyoshi Suzuki, Yamatokooriyama (JP); Kenji Osada, Yamatokooriyama (JP); Yasumasa Yamada, Yamatokooriyama (JP); Ichiro Yamada, Yamatokooriyama (JP)

(73) Assignee: UHA MIKAKUTO CO., LTD., Yamatokooriyama (JP)

( * ) Notice: Subject to any disclaimer, the term of this patent is extended or adjusted under 35 U.S.C. 154(b) by 202 days.

(21) Appl. No.: 15/501,932

(22) PCT Filed: Aug. 7, 2015

(86) PCT No.: PCT/JP2015/072486
§ 371 (c)(1),
(2) Date: Feb. 6, 2017

(87) PCT Pub. No.: WO2016/021717
PCT Pub. Date: Feb. 11, 2016

(65) Prior Publication Data
US 2017/0223982 A1    Aug. 10, 2017

(30) Foreign Application Priority Data

Aug. 8, 2014 (JP) .................... 2014-162406

(51) Int. Cl.
| | | |
|---|---|---|
| A23G 3/50 | (2006.01) | |
| A23G 3/34 | (2006.01) | |
| A23G 3/54 | (2006.01) | |
| A23P 10/30 | (2016.01) | |
| A23P 20/10 | (2016.01) | |

(52) U.S. Cl.
CPC .............. *A23G 3/50* (2013.01); *A23G 3/34* (2013.01); *A23G 3/343* (2013.01); *A23G 3/54* (2013.01); *A23P 10/30* (2016.08); *A23P 20/10* (2016.08); *A23V 2002/00* (2013.01)

(58) Field of Classification Search
CPC ........ A23G 3/0063; A23G 3/34; A23G 3/343; A23G 3/36; A23G 3/42; A23G 3/44; A23G 3/50; A23G 3/54; A23P 20/00; A23P 20/105; A23P 10/30

USPC ........................ 426/10, 138, 302, 573, 660
See application file for complete search history.

(56) References Cited

U.S. PATENT DOCUMENTS

| | | | | |
|---|---|---|---|---|
| 3,529,530 A * | 9/1970 | Tsuzuki | ............ | A22C 13/0016 426/32 |
| 4,497,862 A * | 2/1985 | Cioca | .................... | A61L 15/225 428/220 |
| 5,328,711 A * | 7/1994 | Coleman | .................. | A23G 3/44 426/576 |
| 6,759,074 B2 * | 7/2004 | Tachikawa | ........... | A23G 3/0021 426/576 |

FOREIGN PATENT DOCUMENTS

| | | | | |
|---|---|---|---|---|
| EP | 3170532 A1 * | 5/2017 | ............... | A61N 5/10 |
| JP | S60-68989 U | 5/1985 | | |
| JP | H11-032692 | 2/1999 | | |
| JP | 3169573 B2 | 5/2001 | | |
| JP | 2008-001655 A1 | 1/2008 | | |
| JP | 2011-142906 A1 | 7/2011 | | |
| JP | 2012-152145 A1 | 8/2012 | | |
| JP | 2015-080419 A1 | 4/2015 | | |
| KR | 2010037551 A * | 4/2010 | | |

OTHER PUBLICATIONS

Consider edible collagen film for packaging, Emerging Food R&D Report, Oct. 1, 1995, 1 page.*
T. Hayade; "Collagen Casings;" Meat Science; vol. 37; No. 2; 1996; pp. 189-194, 1 frontsheet and 2 endsheets (9 Sheets) and 2 Sheets translation (11 Sheets total)/Cited in International Search Report.
International Search Report for International Application No. PCT/JP2015/072486 dated Sep. 8, 2015.

* cited by examiner

*Primary Examiner* — Jyoti Chawla
(74) *Attorney, Agent, or Firm* — Kratz, Quintos & Hanson, LLP

(57) ABSTRACT

The present invention provides a high-moisture-content gummi candy as a novel fruity confection, including a gummi candy body having a moisture value of not lower than 20% by weight, a pH of not higher than 4.0, and a water activity value of not higher than 0.86 and a collagen casing coating and encapsulating the gummi candy body. Even with a high moisture content, namely, even with a moisture value of the gummi candy body as high as not lower than 20% by weight, the high-moisture-content gummi candy is remarkably reduced in syneresis, surface melting, stickiness, and the like, has an excellent shape retention ability, has a fresh flavor and an elastic texture, and is suitable for distribution at normal temperature.

6 Claims, No Drawings

HIGH-MOISTURE-CONTENT GUMMI CANDY

TECHNICAL FIELD

The present invention relates to a high-moisture-content gummi candy including a gummi candy body with a high moisture content and a collagen casing encapsulating the gummi candy body. The high-moisture-content gummi candy is reduced in syneresis, surface melting and accompanying surface stickiness, and the like.

BACKGROUND ART

Jellies including gummi candies are popular among consumers because they have an elastic texture and they can be relatively easily flavored with a texture-matching flavor. Among the jellies, gummi candies are particularly popular for the chewy, elastic texture. Gummi candies typically contain gelatin as a primary gelling agent and have a moisture value from about 9% by weight to about 18% by weight, a pH of not higher than 4.0, and a water activity value from about 0.5 to about 0.7. For distribution at normal temperature, an agent such as a glazing agent or a mold release agent is applied to the surface of the gummi candies for preventing the sticky gummi candies from adhering to each other.

When a gummi candy has a moisture value of not lower than 20% by weight, the water activity of the gummi candy is high. This high water activity causes a great increase in an amount of free water molecules moving within the gummi candy from inside to the dry surface thereof, leading to marked syneresis, surface melting, stickiness, and the like (first problem of gummi candies). This first problem cannot be adequately solved by application of a mold release agent or the like to the surface of the gummi candy. Therefore, it is very difficult at present to achieve normal-temperature distribution of gummi candies having a moisture value of not lower than 20% by weight while retaining the characteristics such as quality, flavor, and texture.

Jellies with reduced syneresis have been proposed, and examples thereof include the following: a gel containing carrageenan as a gelling agent and also containing a trivalent or higher-valent metal ion or a divalent metal ion except for Ca (Patent Literature 1); a jelly containing gellan gum or the like as a gelling agent and also containing microcrystalline cellulose (Patent Literature 2); and a jelly containing psyllium seed gum as a gelling agent and having an elastic texture retained after freezing and thawing (Patent Literature 3). These patent literatures only disclose techniques related to reduction of syneresis in jellies containing certain thickening polysaccharides as a gelling agent, but do not disclose any technique related to reduction of syneresis in a gummi candy containing gelatin as a primary gelling agent.

Typical gummi candies have a very low plastic deformation degree, which is as low as not higher than 5%, because of the nature of gelatin serving as a gelling agent. Therefore, typical gummi candies have an excellent shape retention ability and hardly become deformed even when contained in a packaging bag. The plastic deformation degree of a gummi candy depends on gel strength, and the gel strength depends on the moisture value of the gummi candy, the bloom value of gelatin, the gelatin content, and the like. Among these, the moisture value greatly affects the gel strength, and consequently the shape retention ability of the gummi candy. A high-moisture-content gummi candy having a moisture value of not lower than 20% by weight, in particular, has a remarkably low level of shape retention ability and therefore is incapable of retaining its shape as designed when contained in a packaging bag as a commercial product (second problem of gummi candies).

Typically, gummi candies are produced as follows: starch powder is shaped into a mold; a liquid gummi candy base is poured into the starch mold and dried; and the resulting gel is released from the starch mold. A gummi candy base having a high moisture content contains not only a large amount of moisture but also a large amount of starch syrup or the like, and therefore has a low solid content. Because of this low solid content, the base readily takes up starch powder and adheres to the starch mold, which causes "trapping of powder". Consequently, the resulting gummi candy has an unpleasant texture, far from its inherent texture (third problem of gummi candies).

This third problem can be solved by replacing the starch mold with a plastic mold or a metal mold, an inside of which is lined with a mold release agent. However, changing the type of mold is not enough to solve the first and second problems, which are characteristic to a high-moisture-content gummi candy.

Patent Literature 4 discloses production of a gummi candy having a moisture value of about 14% by weight. The production includes filling a casing with a liquid gummi candy base containing hypoallergenic gelatin, sugar, starch syrup, and the like and then cooling and solidifying the liquid gummi candy base, in which the hypoallergenic gelatin contains gelatin derived from type II collagen but contains no gelatin derived from type I or III collagen. Patent Literature 4, which is intended for use of the hypoallergenic gelatin, provides no prediction regarding reduction in syneresis, surface melting, stickiness, or the like of a high-moisture-content gummi candy when produced with use of a casing.

When a food encapsulated within a collagen casing is masticated or licked in an oral cavity, the collagen casing and the encapsulated food may readily separate from each other, and consequently the collagen casing alone remains in the oral cavity, resulting in an unpleasant sensation.

Traditionally, processed meat products such as sausage, wieners, and ham are produced by filling an edible collagen casing, which is used as a substitute for a natural intestine, with beef, pork, fish, or other meat. Another type of processed meat products such as ham and sausage is also popular, which is produced by filling an inedible cellulose casing or plastic casing with meat. This casing is removed immediately before the product is sold to a consumer or the product is eaten.

The meat in these processed meat products receives salting-out or other moisture-retaining treatment immediately before being filled into a casing. In addition, these processed meat products are to be refrigerated. For these reasons, these processed meat products are not likely to undergo syneresis. Besides, a primary role of the casing in these processed meat products is to enhance storage stability of the meat. Therefore, conventional examples of casing usage provide no prediction regarding reduction in syneresis, surface melting, stickiness, or the like during normal-temperature distribution of a high-moisture-content gummi candy including an encapsulation casing.

CITATIONS LIST

Patent Literatures

Patent Literature 1: Japanese Unexamined Patent Application Publication No. 2008-1655

Patent Literature 2: Japanese Patent No. 3169573
Patent Literature 3: Japanese Unexamined Patent Application Publication No. 2011-142906
Patent Literature 4: Japanese Unexamined Patent Application Publication No. 11-32692

SUMMARY OF INVENTION

Technical Problems

An object of the present invention is to provide a high-moisture-content gummi candy having the following characteristics: even with a moisture value as high as not lower than 20% by weight, the high-moisture-content gummi candy is remarkably reduced in syneresis, surface melting, stickiness, and the like, has an excellent shape retention ability, gives no unpleasant sensation but a fresh flavor and an elastic texture enjoyable in the oral cavity, and is suitable for distribution at normal temperature.

Solutions to Problems

The inventors of the present invention have conducted intensive research to achieve the object and, as a result, have found that a high-moisture-content gummi candy including a gummi candy body with a moisture value of not lower than 20% by weight and a collagen casing encapsulating the gummi candy body has the following characteristics: 1) even though the gummi candy body has a high moisture value and the collagen casing is moisture permeable, the gummi candy has a reduced amount of free water molecules moving within the gummi candy body from inside to the surface, is remarkably reduced in syneresis, surface melting, stickiness, and the like, and has a fresh flavor (excellent feel of gummi melting in the mouth) and a chewy, elastic texture; 2) when the gummi candy is in the mouth, the gummi candy body and the collagen casing do not separate from each other and consequently no unpleasant sensation occurs attributable to the collagen casing alone remaining in the oral cavity; and 3) the gummi candy has an excellent shape retention ability and inhibits microbial growth even with the high moisture content, and thus is suitable for distribution at normal temperature. Thus, the present invention has now been completed.

The inventors of the present invention have also found the following: a gummi candy body having the moisture value, the pH, and the water activity value as described above has a fruit-flesh-like texture; and when the gummi candy body is encapsulated within a collagen casing, which is widely used among other casings for giving a crisp texture to processed meat products such as sausage, the collagen casing unexpectedly presents a pericarp-like texture, not a crisp texture. Thus, the inventors of the present invention have found that the high-moisture-content gummi candy of the present invention is a fruity confection having a pericarp-like texture, a fruit-flesh-like texture, and a fruit-like texture that is a combination of the pericarp-like texture and the fruit-flesh-like texture.

Thus, the present invention provides the following high-moisture-content gummi candies (1) to (4).

(1) A high-moisture-content gummi candy having reduced syneresis and reduced surface stickiness, including:
 a gummi candy body; and
 a collagen casing coating and encapsulating the gummi candy body,
the gummi candy body having a moisture value of not lower than 20% by weight, a pH of not higher than 4.0, and a water activity value of not higher than 0.86.

(2) The high-moisture-content gummi candy according to (1), wherein the gummi candy body has a surface tackiness from 500 kg/m$^2$ to 1800 kg/m$^2$.

(3) The high-moisture-content gummi candy according to (1), wherein the gummi candy body has a plastic deformation degree of not lower than 5% and not higher than 25%, and the high-moisture-content gummi candy has a plastic deformation degree of not higher than 5%.

(4) The high-moisture-content gummi candy according to (1), wherein the gummi candy body contains 30% by weight to 75% by weight of a sugar, 0.5% by weight to 15% by weight of a gelling agent, and not less than 20% by weight of water.

Advantageous Effects of Invention

According to the present invention, a high-moisture-content gummi candy remarkably reduced in syneresis, surface melting, stickiness, and the like, having an excellent shape retention ability, and being suitable for distribution at normal temperature can be provided by coating and encapsulating a gummi candy body having a moisture value of not lower than 20% by weight, which readily undergoes syneresis, surface melting, stickiness, and the like by nature, within a collagen casing. For example, the gummi candy of the present invention can be a novel fruity confection.

DESCRIPTION OF EMBODIMENTS

The high-moisture-content gummi candy of the present invention (hereinafter, sometimes simply called "the gummi candy of the present invention") includes a gummi candy body (hereinafter, sometimes simply called "gummi body") having a moisture value of not lower than 20% by weight (preferably from 20% by weight to 40% by weight), a pH of not higher than 4.0 (preferably from 1.9 to 4.0), and a water activity value of not higher than 0.86 (preferably higher than 0.6 and not higher than 0.86) and a collagen casing coating and encapsulating the gummi body.

In the gummi candy of the present invention, the gummi body has a very high moisture value, which is as high as not lower than 20% by weight, and therefore has a certain level of surface tackiness. Because of this surface tackiness, the gummi body when left at normal temperature such as room temperature has marked surface stickiness and syneresis. In addition, the collagen casing encapsulating the gummi body is moisture permeable. These characteristics suggest that when the gummi body having a moisture value of not lower than 20% by weight is coated with the collagen casing, water or sugar solution may ooze from the collagen casing onto a surface thereof. In the gummi candy of the present invention, however, water or sugar solution hardly oozes from the gummi body more than necessary to accumulate at a boundary between the gummi body and the collagen casing or to permeate the collagen casing to reach the surface of the gummi candy. Therefore, the surface of the gummi candy of the present invention is very unlikely to undergo syneresis or very unlikely to become sticky. The mechanism of this phenomenon is not clearly understood at this point, but is conjectured that the surface of the gummi body is in contact with the collagen casing and this contact contributes to moderate reduction in movement of free water molecules within the gummi body from inside to the surface.

In the gummi candy of the present invention, the gummi body and the collagen casing adhere to each other due to the surface tackiness of the gummi body, leading to remarkable inhibition of separation of the collagen casing from the gummi body in the mouth and consequently remarkable inhibition of the collagen casing from remaining alone in an oral cavity, thereby giving no unpleasant sensation. As a result, the gummi candy of the present invention can have its inherent elastic texture and also have a fresh feel of gummi melting in the mouth primarily attributable to the high moisture content. Thus, the gummi candy of the present invention is a fruity confection having a pericarp-like texture, a fruit-flesh-like texture, and a fruit-like texture that is a combination of the pericarp-like texture and the fruit-flesh-like texture.

The high-moisture-content gummi body of the present invention has a poor shape retention ability, and the collagen casing used in the present invention has no shape retention ability. In addition, the gummi body of the present invention is not pressure loaded into the collagen casing. Despite these conditions, a predetermined surface tackiness of the gummi body of the present invention enhances adhesion between the gummi body and the collagen casing, whereby the gummi candy of the present invention unexpectedly has an excellent shape retention ability.

The gummi candy of the present invention thus does not undergo syneresis, surface melting, stickiness, or the like, has an excellent shape retention ability, and is capable of inhibiting microbial growth when properties of the gummi candy such as the water activity value and the pH are appropriately controlled. Therefore, the gummi candy of the present invention is suitable for distribution at normal temperature. The gummi candy of the present invention has an additional advantage attributable to the high moisture content. More specifically, the gummi candy of the present invention has a lasting fresh flavor (excellent feel of gummi melting in the mouth) and a lasting elastic texture.

Next, the gummi body and the collagen casing constituting the gummi candy of the present invention are described sequentially and more specifically.

[Gummi Body]

The gummi body of the present invention may be a typical gummi candy. Typically, a gummi candy contains a gelling agent, a sugar, an acidulant, an additive, water, and the like. A gummi candy produced by appropriately selecting types of the gelling agent, the sugar, the acidulant, and the additive, and then appropriately selecting contents of these ingredients and water, and consequently having a moisture value of not lower than 20% by weight, a pH of not lower than 4.0, and a water activity value of not higher than 0.86 may be used as the gummi body of the present invention. Other than these properties, namely, a moisture value of not lower than 20% by weight, a pH of not higher than 4.0, and a water activity value of not higher than 0.86, the gummi body according to a preferable embodiment of the present invention has the same configuration as that of a typical gummi candy. For example, the gummi body according to an embodiment of the present invention may contain water, a gelling agent primarily composed of gelatin or the like, a sugar, an acidulant, and the like, and may further contain an additive as needed.

The gelatin as a primary component of the gelling agent may be produced, for example, by subjecting a gelatin material containing collagen to acid treatment or alkali treatment, followed by rinsing with water, extraction, and purification. The collagen-containing gelatin material is not particularly limited, and examples thereof include materials derived from animals and birds, such as cow bones, cowhide, pig bones, pigskin, chicken bones, and chicken skin, and materials derived from aquatic organisms such as fish, fish skin, and fish scales. Preferably, the gelatin used in the present invention has a bloom value of not lower than 100 bloom. The gelatin may be used alone or as a combination of two or more of these. The content of the gelling agent in the gummi body is not particularly limited, and is appropriately selected from the range from 0.5% by weight to 15% by weight, more preferably the range from 5.5% by weight to 15% by weight, further preferably the range from 6% by weight to 15% by weight of the gummi body as a whole, for instance.

In the present invention, an additional gelling agent other than gelatin may be used together with gelatin provided that the excellent effects of the present invention are not impaired. Examples of the additional gelling agent other than gelatin include natural thickening polysaccharides such as agar-agar, furcellaran, carrageenan, guar gum, locust bean gum, psyllium seed gum, tamarind seed gum, tara gum, pectin, tragacanth gum, karaya gum, xanthan gum, curdlan, gellan gum, soy polysaccharides, alginic acid, and carboxymethylcellulose. The thickening polysaccharides may be used alone or as a combination of two or more of these. In the present invention, a gelling agent primarily composed of a thickening polysaccharide may also be used provided that the moisture value, the pH, and the water activity value described above are achieved.

The sugar is not particularly limited, and may be a sugar conventionally used in gummi candies. Examples of the sugar include monosaccharides such as glucose and fructose; disaccharides such as sucrose, lactose, and trehalose; sugar alcohols such as maltitol, lactitol, sorbitol, mannitol, xylitol, erythritol, glycerol, reduced starch hydrolysis products (reduced starch saccharification products), Palatinit (trademark), Palatinose (trademark), and Reduced Palatinose (trademark); oligosaccharides such as raffinose, stachyose, reduced xylooligosaccharides, reduced branched oligosaccharides, fructooligosaccharides, inulooligosaccharides, galactooligosaccharides, isomaltooligosaccharides, maltooligosaccharides, lactosucrose, xylooligosaccharides, soy oligosaccharides, and palatinose oligosaccharide; sugar syrups such as starch syrup, reduced starch syrup, enzymatically degraded starch syrup, fructose-glucose syrup, and glucose syrup; and dietary fibers such as resistant dextrins and polydextroses. The gummi candy of the present invention having a high content of a monosaccharide and/or a disaccharide, among these sugars, has a strong fruit-like sweetness. The sugar may be used alone or as a combination of two or more of these. The content of the sugar in the gummi body is not particularly limited, and may be appropriately selected from the range from 30% by weight to 75% by weight, more preferably from 40% by weight to 70% by weight, further preferably from 45% by weight to 65% by weight of the gummi body as a whole, for instance.

The acidulant is not particularly limited, and may be an acidulant conventionally used in a food field. Examples of the acidulant include citric acid, malic acid, tartaric acid, lactic acid, acetic acid, and phytic acid. For example, the acidulant may be fruit juice containing the acidulant as described above. The acidulant may be used alone or as a combination of two or more of these. The content of the acidulant in the gummi body may be selected so as to achieve a pH of the gummi body of not higher than 4.0, preferably from 1.9 to 4.0, more preferably from 1.9 to 3.5. When the pH of the gummi body is higher than 4.0, an effect to inhibit growth of microorganisms such as mold and yeast in an acidic condition is poor, and the gummi body contains sufficient free water due to the high moisture content. In this case, microorganisms such as mold and yeast may grow during distribution at normal temperature. When the content of the acidulant is appropriately selected, the gummi candy of the present invention can have a flavor further close to that of fruits.

The additive is not particularly limited, and may be an additive conventionally used in gummi candies. Examples of the additive include starch, processed starch, natural ingredients, colorants, perfumes, and food dyes. A purpose of adding the additive is, for example, to further improve the texture, scent, appearance, and the like of the gummi body, and consequently to further improve the texture, scent, appearance, and the like of the gummi candy of the present invention. The additive may be used alone or as a combination of two or more of these.

The moisture value (moisture content) of the gummi body is not lower than 20% by weight, preferably from 20% by weight to 40% by weight, more preferably from 25% by weight to 40% by weight, further preferably from 23% by weight to 38% by weight, particularly preferably from 24% by weight to 36% by weight of the gummi body as a whole from various viewpoints such as achieving a fresh flavor and an elastic texture of the gummi candy of the present invention. When the moisture value is lower than 20% by weight, the resulting flavor and texture are the same as those of conventional commercially available gummi candies, not the fresh flavor and the elastic texture of the gummi candy of the present invention.

The water activity value of the gummi body is typically not higher than 0.86, preferably higher than 0.6 and not higher than 0.86, more preferably from 0.7 to 0.86 from the viewpoint of inhibiting growth of microorganisms such as mold and yeast during distribution at normal temperature. The water activity value of the gummi candy of the present invention can be controlled by appropriately selecting the moisture content, the types and the contents of the sugar, the acidulant, and other additives, and the like.

Examples of the gummi body according to a preferable embodiment of the present invention include a gummi body containing the sugar in a content from 30% by weight to 75% by weight (more preferably from 40% by weight to 70% by weight, further preferably from 45% by weight to 65% by weight), the gelling agent in a content from 0.5% by weight to 15% by weight (more preferably from 5.5% by weight to 15% by weight, further preferably from 6% by weight to 15% by weight), and water in a content not lower than 20% by weight (more preferably from 20% by weight to 40% by weight, further preferably from 25% by weight to 40% by weight, particularly preferably from 23% by weight to 38% by weight, most preferably from 24% by weight to 36% by weight), relative to the gummi body as a whole, further containing an acidulant or the like for the purpose of adjusting the pH to not higher than 4.0 (more preferably from 1.9 to 4.0, further preferably from 1.9 to 3.5), and having a water activity value of not higher than 0.86 (preferably higher than 0.6 and not higher than 0.86, more preferably from 0.7 to 0.86). In this gummi body, the gelling agent is preferably gelatin.

The surface tackiness of the gummi body is preferably from 500 kg/m$^2$ to 1800 kg/m$^2$, more preferably from 600 kg/m$^2$ to 1600 kg/m$^2$, further preferably from 500 kg/m$^2$ to 1500 kg/m$^2$. When the surface tackiness of the gummi body is within the range, adhesion between the gummi body and the collagen casing is enhanced, leading to remarkable inhibition of separation of the collagen casing from the gummi body in the mouth and consequently remarkable inhibition of the collagen casing from remaining alone in the oral cavity, thereby giving no unpleasant sensation. When the surface tackiness is lower than 500 kg/m$^2$, the collagen casing may remain alone in the oral cavity, leading to an unpleasant sensation. When the surface tackiness is higher than 1800 kg/m$^2$, the gummi candy of the present invention may stick to a tooth in the mouth, for instance, leading to an unpleasant sensation. Examples of the method of adjusting the surface tackiness of the gummi body to fall within the predetermined range include a method involving using gelatin as the gelling agent and controlling the gelatin content so as to adjust the moisture value to fall within the predetermined range. The method of measuring the surface tackiness will be described in detail in the section of EXAMPLES.

The plastic deformation degree of the gummi body is preferably not lower than 5%, more preferably not lower than 10%, further preferably from 10% to 25%. When the gummi body encapsulated in the collagen casing has a plastic deformation degree within the range, the gummi candy of the present invention can have a plastic deformation degree of not higher than 5%, leading to an enhanced shape retention ability. Having a high moisture content, the gummi body in the gummi candy of the present invention typically has a plastic deformation degree of not lower than 5%. When the plastic deformation degree of the gummi body is higher than 25%, it may be difficult to maintain the shape retention ability of the gummi candy of the present invention. The plastic deformation degree of the gummi body can be controlled by appropriately selecting the content of the gelling agent such as gelatin and/or the moisture value, for example. The plastic deformation degree of the gummi candy can be controlled by appropriately selecting the plastic deformation degree of the gummi body, and/or the collagen content and/or the thickness of the collagen casing, for example. The method of measuring the plastic deformation degrees of the gummi body and the gummi candy of the present invention will be described in detail in the section of EXAMPLES.

[Collagen Casing]

The collagen casing coating and encapsulating the gummi body is not particularly limited, and may be any commercially available product containing collagen or containing both collagen and cellulose. In view of adhesion to the surface of the gummi body, for instance, the collagen casing preferably contains both collagen and cellulose. The collagen content in the collagen casing is from 20% by weight to 90% by weight, preferably from 40% by weight to 80% by weight. From the viewpoints of adhesion to the surface of the gummi body, low solubility, and no unpleasant sensation occurring in the oral cavity, it is more preferable that the collagen casing has a collagen content from 40% by weight to 80% by weight and a cellulose content of not higher than 10% by weight. From the viewpoints of flexibility, processability (workability), and stability (such as break resistance), for example, the collagen casing may contain not only collagen and cellulose but also one or more ingredients among vegetable oils such as palm oil, olive oil, coconut oil, and palm kernel oil, plasticizers such as glycerol, and stabilizers, for example.

The thickness of the collagen casing is not particularly limited, and is appropriately selected depending on the moisture value of the gummi body, remain-restraint properties an extent of the collagen casing remaining in the oral cavity, the shape retention ability of the gummi candy of the present invention, and the like. A typical, commercially available collagen casing can be used as it is. More specifically, the thickness of a typical, commercially available collagen casing is preferably not greater than 0.5 mm, more preferably not greater than 0.3 mm, further preferably from 0.1 mm to 0.3 mm. When the thickness of the collagen casing is greater than 0.5 mm, an unpleasant sensation may occur in the mouth attributed to the collagen casing not adequately torn apart or the collagen casing remaining in the oral cavity, for instance.

A commercially available collagen casing is typically cylindrical, and a length and a diameter of the cylinder may be appropriately selected depending on the confectionary design of the gummi candy of the present invention. Alternatively, the gummi candy of the present invention may be produced by making the collagen casing into a container having any shape and dimension and then filling this container with the gummi candy base.

[Method of Producing Gummi Candy of the Present Invention]

An example of the method of obtaining the gummi candy of the present invention includes adding the gelling agent such as gelatin, the sugar, the acidulant, and, as needed, the additive, to water; heating the resulting mixture for dissolution; filling the collagen casing with the resulting liquid gummi candy base; twisting the resulting collagen casing at both ends so that the resulting product has a predetermined length, just like how a wiener looks; performing cooling so as to solidify the liquid gummi candy base within the collagen casing; and cutting the twisted ends off.

The resulting gummi candy of the present invention, even having a high moisture content, namely, a moisture value as high as not lower than 20% by weight, is free of syneresis, surface melting, stickiness, or the like, has a fresh flavor and an elastic texture, has a relatively good shape retention ability, and is suitable for distribution at normal temperature. Preferably, the gummi candy of the present invention has a plastic deformation degree of not higher than 5%, and thereby has a further enhanced shape retention ability. In this case, the gummi candy substantially maintains its shape constant after filled in a package such as a bag and distributed in the market. The gummi candy of the present invention having a plastic deformation degree of not higher than 5% can be obtained by coating and encapsulating the gummi body having a plastic deformation degree of not lower than 5% within the collagen casing, as described above.

The shape and a dimension of the gummi candy of the present invention may be appropriately selected depending on the confectionary design thereof (for example, a design to make the gummi candy look like a fruit such as a grape). For example, the gummi candy of the present invention preferably has a bite size with a shape substantially spherical, elongated spherical (barrel-like shape), or substantially ellipsoidal (a shape of a rugby ball) and a diameter in a direction transverse to the axis preferably from about 0.5 cm to about 3 cm, more preferably from about 0.8 cm to about 1.5 cm.

The gummi candy of the present invention is formed of the gummi body encapsulated within the collagen casing. Therefore, gel strength thereof measured with a plunger penetrating in a thickness direction preferably changes in three levels.

In the following, the three levels of gel strength of the gummi candy are described more specifically. When a plunger for gel strength measurement penetrates into the gummi candy in the thickness direction, the plunger first comes into contact with an outer surface of the collagen casing of the gummi candy. A portion that primarily includes the collagen casing and where the plunger reaches after it has pierced the outer surface of the collagen casing is called a first pericarp-like portion. After penetrating the first pericarp-like portion, the plunger penetrates into the gummi body (flesh-like portion) adjacent to the first pericarp-like portion in a plunger-penetrating direction. After penetrating the gummi body, the plunger comes into contact with and pierces an inner surface of the collagen casing, which is located on an opposite side of the gummi candy to the first pericarp-like portion. A portion that is adjacent to the surface of the gummi body in the plunger-penetrating direction, that primarily includes the collagen casing, and where the plunger reaches after it has pierced the inner surface of the collagen casing is called a second pericarp-like portion.

By designing the gel strength to change from the first pericarp-like portion (first level) through the gummi body (the flesh-like portion, second level) to the second pericarp-like portion (third level), the gummi candy of the present invention can have three levels of the gel strength. In a preferable embodiment, the gel strength in the first pericarp-like portion is from 2.94 MPa to 4.90 MPa (from $3.0 \times 10^5$ $kg/m^2$ to $5.0 \times 10^5$ $kg/m^2$), the gel strength in the gummi body is from 0.49 MPa to 1.97 MPa (from $0.5 \times 10^5$ $kg/m^2$ to $2.0 \times 10^5$ $kg/m^2$), and the gel strength in the second pericarp-like portion is from 3.43 MPa to 5.40 MPa (from $3.5 \times 10^5$ $kg/m^2$ to $5.5 \times 10^5$ $kg/m^2$). When the gel strengths in each of the first pericarp-like portion, the gummi body, and the second pericarp-like portion are designed to fall within the respective ranges, the gummi candy of the present invention has a pericarp-like texture, a fruit-flesh-like texture, and a fruit-like texture that is a combination of the pericarp-like texture and the fruit-flesh-like texture, each of these textures being displayed distinctly and excellently. The change in the gel strength in three levels is exhibited when the gummi body has the predetermined moisture value, the predetermined pH, and the predetermined water activity value described above.

Depending on the selected type of fruit, the selected dimension, and the like, the composition of the gummi body may be adjusted within the predetermined range described above, for instance. Along with this adjustment, the three levels of the gel strength in the first pericarp-like portion, the gummi body, and the second pericarp-like portion may be designed differently from the ranges described above.

The gel strength herein was measured with a rheometer (Texture Analyzer TA. XT. plus (trade name) manufactured by Stable MicroSystems) and a cylindrical plunger having a diameter of 2 mm, which was pressed against and made penetrate into the gummi candy at a temperature of 20° C., a penetration distance of 200%, and a penetration speed of 1 mm/sec. Other conditions were set in accordance with a manual attached to the rheometer. Each gel strength value is measured as a gel strength at which the plunger breaks each of the first pericarp-like portion, the gummi body, and the second pericarp-like portion of the gummi candy.

EXAMPLES

The present invention will be described more specifically by way of examples and comparative examples. The scope of the present invention, however, is not limited to these examples. In the examples and the comparative examples, parts and % values are parts by weight and % by weight, respectively, unless otherwise indicated. In the examples and the comparative examples, physical properties such as pH, moisture value (%), water activity value (Aw), surface tackiness ($kg/m^2$), syneresis degree (%), and plastic deformation degree (%) are measured as follows.

<pH>

A pH meter (manufactured by HORIBA, Ltd.) was used for measurement. The method of measurement was as follows: 5 g of a specimen was dissolved in 100 g of hot water at 80° C. (pH=7); the temperature was decreased to 25° C., at which measurement was conducted; and the resulting value was used for determining the pH value of the specimen.

<Moisture Value (Moisture Content)>

The moisture value (%) was measured by a vacuum drying method.

<Water Activity Value (Aw)>

The water activity value was measured at a temperature of 25° C. with a water activity meter for measurement at a constant temperature (LabMASTER-aw BASIC (trade name) manufactured by Novasina).

<Surface Tackiness>

A specimen was fixed on a surface of a platform of a rheometer (Texture Analyzer TA. XT. plus (trade name) manufactured by Stable MicroSystems). A cylindrical plunger having a diameter of 2 mm was pressed against the specimen at a temperature of 20° C. for penetration at as a penetration distance of 200%. After this, the plunger was raised in a vertical direction at a speed of 1 mm/second, and the tension ($kg/m^2$) generated during the raising was measured and defined as the surface tackiness. Conditions other than the temperature and the raising speed were set in accordance with a manual attached to the rheometer. In the case of a specimen formed of a gummi body and a collagen casing encapsulating the gummi body, the specimen was cut at a plunger side in a lateral cross section (a plane substantially parallel to the surface of the platform) so as to allow the cylindrical plunger to come into contact with and adhere to the exposed gummi body.

<Syneresis Degree>

A specimen having a moisture value of X (%) was hermetically sealed with a breathable, transparent polyethylene material. The resultant was left in a thermostat at 25° C. and 40% to 50% humidity for 7 days. Then, the specimen was dried under conditions of −0.085 MPa and 85° C. for 6 hours. The moisture value Y (%) after the specimen left in the thermostat was measured, which was used to calculate the syneresis degree (%)=X−Y.

<Plastic Deformation Degree>

A specimen having a height of H0 was fixed on a surface of a platform of a rheometer (the same rheometer as above). A cylindrical plunger having a diameter of 25 mm was pressed against the specimen from above in a vertical direction for 1 minute to apply a load of 200 g, followed by separating the specimen from the rheometer. The thickness of the specimen between a bottom face pressed against the surface of the platform of the rheometer and a top face pressed against the plunger was measured with vernier calipers (CD-15PSX (trade name) manufactured by Mitutoyo Corporation) to obtain a height H1 of the specimen after pressing. Based on the following expression, the deformation degree (%) was calculated. To prevent deformation attributed to stickiness of the specimen, a mold release agent was applied to the surface of the platform of the rheometer and to a plane of the plunger that was to come into contact with the specimen.

Deformation degree (%)=[(*H*0−*H*1)/*H*0]×100

<Durability Test>

Ten pieces of gummi candies were hermetically sealed with an aluminum-deposited polyethylene material. The resultant was left under conditions at 37° C. and 85% humidity for 60 days. Visual examination was conducted for mold or yeast.

Example 1

In 25 parts of water, 26 parts of sugar, 40 parts of starch syrup, 7.3 parts of gelatin, 1.5 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen having a weight of 5.5 g for physical property measurement was thereby prepared.

A cylindrical collagen casing having a thickness of 0.2 mm, a collagen content of 50%, and a diameter of 19 mm was filled with the remainder of the gummi candy base prepared above. The resulting collagen casing was twisted at every 20 mm, and then left to cool and solidify at normal temperature for 12 hours. Then, the collagen casing was cut at the twisted sections to prepare a gummi candy of the present invention encapsulating the gummi body within the collagen casing and having a weight of about 5.5 g. Physical properties of the resulting gummi body and the resulting gummi candy are shown in Table 1.

The resulting gummi candy had a collagen casing with a pericarp-like texture and a gummi body with a fruit-flesh-like flavor and a fruit-flesh-like texture. Consequently, the gummi candy had a fruit-like texture that was a combination of the pericarp-like texture and the fruit-flesh-like texture. Therefore, the gummi candy was a novel fruity confection.

Example 2

In 30 parts of water, 24 parts of sugar, 37 parts of starch syrup, 7.3 parts of gelatin, 1.5 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen for physical property measurement was thereby prepared. A gummi candy of the present invention as a fruity confection was obtained in the same manner as in Example 1 except that the remainder of the gummi candy base was used.

Example 3

In 35 parts of water, 22 parts of sugar, 35 parts of starch syrup, 7.3 parts of gelatin, 1.5 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen for physical property measurement was thereby prepared. A gummi candy of the present invention as a fruity confection was obtained in the same manner as in Example 1 except that the remainder of the gummi candy base was used and the collagen content of the collagen casing was 60%.

Physical properties of the gummi bodies and the gummi candies obtained in Examples 1 to 3 are shown in Table 1. Each of the gummi candies obtained in Examples 1 to 3 had a fresh flavor typical for a gummi body (an excellent feel of gummi melting in the mouth, a fruit-flesh-like flavor), an elastic texture (a fruit-flesh-like texture), and the texture of the collagen casing breaking upon biting (a pericarp-like texture), with no unpleasant sensation attributable to the collagen casing alone remaining in the oral cavity. Therefore, the gummi candy was a novel fruit-like gummi candy. In the durability test of the gummi candies obtained in Examples 1 to 3, no microorganisms such as mold or yeast was observed. The flavor and the texture of each of the gummi candies right after preparation were maintained after the durability test.

Comparative Example 1

In 40 parts of water, 19 parts of sugar, 32 parts of starch syrup, 7.3 parts of gelatin, 1.5 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen for physical property measurement was thereby prepared. A comparative gummi candy having a weight of about 5.5 g was obtained in the same manner as in Example 3 except that the remainder of the gummi candy base was used.

Comparative Example 2

In 45 parts of water, 13 parts of sugar, 23.2 parts of starch syrup, 7.3 parts of gelatin, 1.3 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen for physical property measurement was thereby prepared. A comparative gummi candy having a weight of about 5.5 g was obtained in the same manner as in Comparative Example 1 except that the remainder of the gummi candy base was used.

Comparative Example 3

A plastic mold was filled with a gummi candy base prepared in the same manner as in Example 2, and the resultant was left to cool and solidify at normal temperature for 12 hours. A comparative gummi candy having a weight of 5.5 g (corresponding to the gummi body in Example 2) was thereby prepared. Physical properties of the gummi candy are shown in Table 1.

Comparative Example 4

A plastic mold was filled with a gummi candy base prepared in the same manner as in Comparative Example 1, and the resultant was left to cool and solidify at normal temperature for 12 hours. A comparative gummi candy having a weight of 5.5 g (corresponding to the gummi body in Comparative Example 1) was thereby prepared. Physical properties of the gummi candy are shown in Table 1.

Comparative Example 5

In 18 parts of water, 31 parts of sugar, 42 parts of starch syrup, 7.3 parts of gelatin, 1.5 parts of an acidulant, and 0.2 parts of a perfume were dissolved under heating. A liquid gummi candy base was thereby prepared. A plastic mold was filled with a portion of the resulting gummi candy base, and the resultant was left to cool and solidify at normal temperature for 12 hours. A gummi body specimen for physical property measurement was thereby prepared. A comparative gummi candy having a weight of about 5.5 g was obtained in the same manner as in Example 1 except that the remainder of the gummi candy base was used. Physical properties of the gummi body and the gummi candy are shown in Table 1.

Comparative Example 6

A plastic mold was filled with a gummi candy base prepared in the same manner as in Comparative Example 5, and the resultant was left to cool and solidify at normal temperature for 12 hours. A comparative gummi candy having a weight of 5.5 g (corresponding to the gummi body in Comparative Example 5) was thereby prepared. Physical properties of the gummi candy are shown in Table 1.

TABLE 1

| | | Example | | | Comparative Example | | | | | |
|---|---|---|---|---|---|---|---|---|---|---|
| | | 1 | 2 | 3 | 1 | 2 | 3 | 4 | 5 | 6 |
| Gummi body | pH | 3.1 | 3.1 | 3.1 | 3.2 | 3.5 | 3.1 | 3.1 | 2.9 | 2.9 |
| | Water activity value | 0.795 | 0.839 | 0.852 | 0.939 | 0.968 | 0.839 | 0.939 | 0.623 | 0.623 |
| | Moisture value (%) | 24.8 | 30.2 | 35.1 | 40.1 | 45.3 | 30.2 | 40.1 | 17.8 | 17.8 |
| | Deformation degree (%) | 5.91 | 6.81 | 7.89 | — | — | — | — | 0.07 | — |
| | Surface tackiness (kg/m$^2$) | 1159.2 | 1084.9 | 929.3 | 523.5 | 252.8 | 1084.9 | 523.5 | 1245.6 | 1245.6 |
| Gummi candy | Casing | Yes | Yes | Yes | Yes | Yes | No | No | Yes | No |
| | Surface tackiness (kg/m$^2$) | 0 | 0 | 0 | 0 | 0 | 1084.9 | 267.2 | 0 | 1245.6 |
| | Syneresis degree (%) | 0.62 | 0.85 | 1.23 | 2.43 | 2.91 | 5.82 | 5.15 | 17.6 | 17.9 |
| | Deformation degree (%) | 1.20 | 1.37 | 1.95 | 1.70 | 4.27 | 6.81 | 10.0 | 0.04 | 0.07 |
| | Durability test | No | No | No | Yes | Yes | No | Yes | No | No |

Results in Table 1 show that a high-moisture-content gummi candy including a collagen casing for encapsulation was remarkably reduced in surface melting and accompanying surface stickiness, among others. As for syneresis, presence of a collagen casing in a gummi candy having a moisture value of 18% did not change the syneresis degree to an observable extent, but presence of a collagen casing in a high-moisture-content gummi candy having a moisture value of not lower than 20% showed remarkable action of reducing syneresis. As for the plastic deformation degree ("Deformation degree" in Table 1), a gummi body having a high moisture content typically has a low plastic deformation degree, and thereby readily undergoes deformation. However, when the gummi body was encapsulated within a collagen casing, the amount of the gummi body within the casing was maintained and consequently the shape retention ability was enhanced. The shape retention ability of a gummi body having a moisture value of not lower than 30% was remarkably enhanced in particular.

The present invention has proven that a high-moisture-content gummi candy having a moisture value of not lower than 20% by weight is reduced in syneresis, surface melting, stickiness, and the like when including a collagen casing for encapsulation. When a high-moisture-content gummi body is encapsulated within a collagen casing, the high-moisture-content gummi candy has a reduced plastic deformation degree and an enhanced shape retention ability. When the gummi body of the present invention has a pH of not higher than 4.0 and a water activity value of not higher than 0.86, no microorganisms such as mold or yeast grow. From these phenomena, the gummi candy of the present invention has been proven to be suitable for distribution at normal temperature.

The invention claimed is:

1. A high-moisture-content gummi candy, comprising:
a gummi candy body; and
a moisture-permeable collagen casing coating and encapsulating the gummi candy body, wherein:
the collagen casing contains collagen and cellulose, and the collagen content of the collagen casing is in the range of 20 to 90% by weight;
the thickness of the collagen casing is 0.5 mm or less;
the gummi candy body has a moisture value of not lower than 20% by weight, a pH of not higher than 4.0, and a water activity value of not higher than 0.86; and
the gummi candy has a syneresis degree of 1.23% or less.

2. The high-moisture-content gummi candy according to claim 1, wherein the gummi candy body has a surface tackiness from 500 kg/m$^2$ to 1800 kg/m$^2$.

3. The high-moisture-content gummi candy according to claim 1, wherein the gummi candy body has a plastic deformation degree of not lower than 5% and not higher than 25%, and the high-moisture-content gummi candy has a plastic deformation degree of not higher than 5%.

4. The high-moisture-content gummi candy according to claim 1, wherein the gummi candy body contains 30% by weight to 75% by weight of a sugar, 0.5% by weight to 15% by weight of a gelling agent, and not less than 20% by weight of water.

5. The high-moisture-content gummi candy according to claim 1, wherein:
the collagen casing is a container having any shape and dimension.

6. The high-moisture-content gummi candy according to claim 1, wherein:
the collagen content in the collagen casing is from 40% by weight to 80% by weight; and
the cellulose content in the collage casing is 10% by weight or less.

* * * * *